United States Patent
Singh et al.

(10) Patent No.: US 6,763,453 B2
(45) Date of Patent: Jul. 13, 2004

(54) SECURITY ON HARDWARE LOOPS

(75) Inventors: Ravi P. Singh, Austin, TX (US); Thomas Tomazin, Austin, TX (US); Charles P. Roth, Austin, TX (US); William C. Anderson, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 735 days.

(21) Appl. No.: 09/753,081

(22) Filed: Dec. 28, 2000

(65) Prior Publication Data

US 2002/0087853 A1 Jul. 4, 2002

(51) Int. Cl.[7] .................................................. G06F 9/38
(52) U.S. Cl. ...................................................... 712/241
(58) Field of Search ........................................ 712/241

(56) References Cited

U.S. PATENT DOCUMENTS

| 5,710,913 A | 1/1998 | Gupta et al. |
| 5,734,880 A | 3/1998 | Guttag et al. |
| 5,794,029 A * | 8/1998 | Babaian et al. ............. 712/241 |
| 6,345,357 B1 * | 2/2002 | Sato ........................... 712/241 |

FOREIGN PATENT DOCUMENTS

| EP | 0 221 741 A2 | 5/1987 |
| EP | 0 487 082 A2 | 5/1992 |

OTHER PUBLICATIONS

Lister, A.M., *Fundamentals of Operating Systems*, MacMillan Publishers Ltd., London, UK, Third Edition, 1985, pp 28–29.

* cited by examiner

Primary Examiner—William M. Treat
(74) Attorney, Agent, or Firm—Fish & Richardson P.C.

(57) ABSTRACT

In an embodiment, a processor may be operable in a user mode and in a supervisor mode. The processor may initialize hardware loops in the user mode by loading a top instruction address in a LOOP_TOP register and a bottom instruction address in a LOOP_BOT register.

46 Claims, 5 Drawing Sheets

SECURITY ON HARDWARE LOOPS

BACKGROUND

In designing a programmable processor, such as a digital signal processing (DSP) system, processing speed and power consumption may form tradeoffs. Conventional processors include a variety of hardware designed to increase the speed at which software instructions are executed. The additional hardware, however, typically increases the power consumption of the processor.

A "hardware loop" may increase the speed of a programmable processor. This may be implemented using dedicated hardware designed to expedite the execution of software instructions within a loop construct. Hardware loops may reduce the number of clock cycles used to execute a software loop by caching the instructions in local registers, thereby reducing the need to fetch the same instruction from a memory device or instruction cache a number of times.

Hardware loops introduce several challenges. These challenges include avoiding penalties such as setup penalties or branch penalties. Setup penalties include the loss of performance (usually an increase in processing time) associated with setting up a hardware loop. Similarly, branch penalties are the loss of performance (again, usually an increase in processing time) associated with a branch.

DETAILED DESCRIPTION

Figure 1:
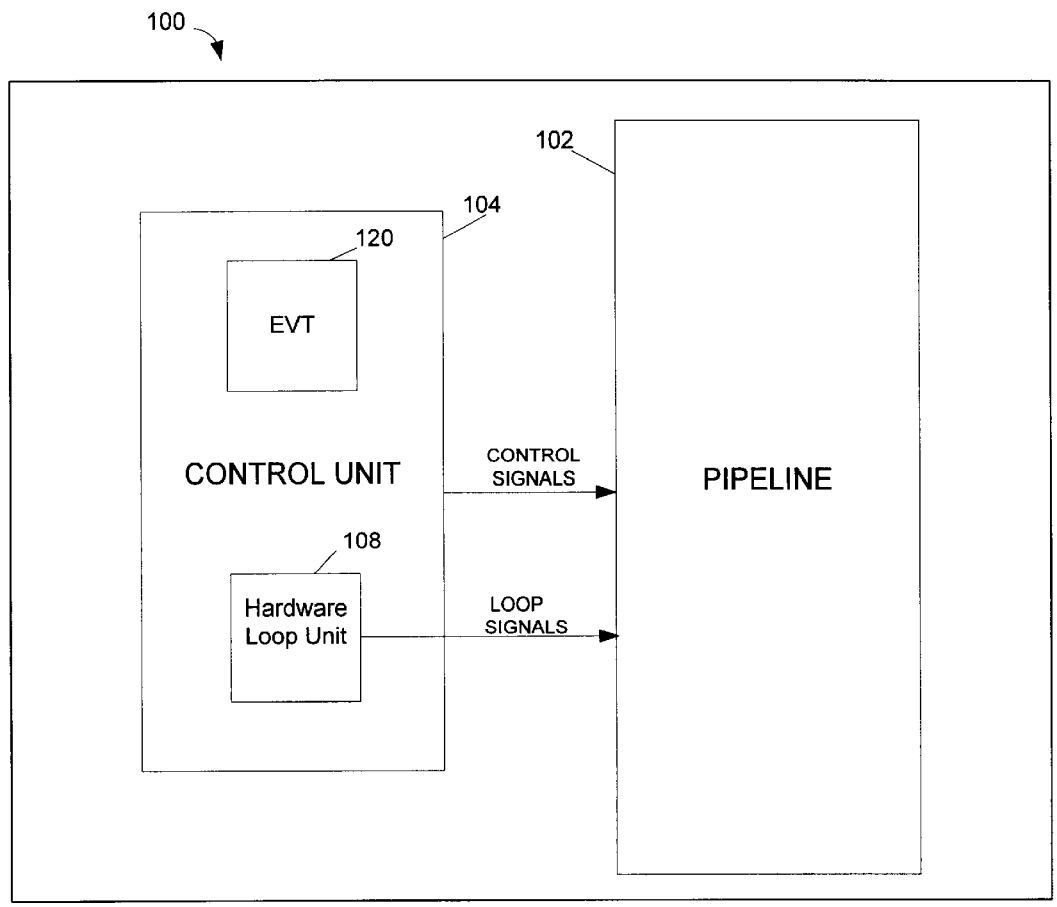
FIG. 1 is a block diagram illustrating an example of a pipelined programmable processor according to an embodiment of the invention.

FIG. 1 is a block diagram illustrating a programmable processor 100 arranged to support hardware loops and security on hardware loop operations without significantly increasing power consumption.

The processor 100 may be operable in a supervisor mode and in a user mode. The processor 100 may operate in the supervisor mode when used by a supervisor program such as an operating system. The processor 100 may operate in the user mode when used by a user program such as an application.

In the supervisor mode, the processor 100 may have certain privileges. These privileges may include the use of certain instructions, access to certain resources, e.g., registers, and extended read/write access to memory. These privileges may enable the supervisor program to control the overall state of the system, for example, by putting the system to "sleep", writing to architectural registers and performing read/write operations to memory locations used for vital system operations.

In the user mode, the processor 100 may not have such privileges. This restriction may be provided as a security measure, preventing the user program from accidentally or intentionally influencing system level operations. For example, a malicious user program, such as a virus, could corrupt or delete operating system files or otherwise disable the system with the appropriate access privileges.

The processor 100 may use hardware loops in the user mode. An implementation of a hardware loop operation may provide a user program a backdoor into the supervisor mode, thereby creating a security hazard. In an embodiment, the hardware loop operation includes a security feature, which may be implemented in hardware that removes this security hazard.

In order to support hardware loops, the processor 100 may support a loop setup instruction that initializes the hardware by setting entry and exit conditions for the loop. Entry and exit conditions may be defined by loop conditions: top, bottom and count. The top condition defines the first instruction (or top) of a loop. The bottom condition defines the last instruction (or bottom) of a loop. The count condition defines the number of iterations of the loop.

An instruction in the program code being executed by the processor 100 may have an associated instruction address, or program count (PC), which points to that instruction's location in memory. In an embodiment, instructions may be aligned at even addresses, for example, the instruction addresses may be two bytes (16-bit) or four bytes (32-bit) wide.

Program code may be executed sequentially unless an event occurs, such as a taken branch or an interrupt, that causes the program counter to branch to a different location. Thus, absent a change in program flow, the PC of a subsequent instruction is the address of the subsequent instruction in the instruction address space. For example, if the PC of the current instruction is 2002 (in hexadecimal) and the instruction is 16-bits (two bytes) wide, the PC of the subsequent instruction would be 2004.

Entry of a hardware loop may occur at the first "top match." A top match may occur when the PC is pointing to the top instruction of a loop. Exit of a hardware loop may occur at the last "bottom match." A bottom match may occur when the PC is pointing to the bottom instruction of a loop.

By initializing the count at the first top match and decrementing the count at each bottom match, the hardware may keep track of when it has encountered the last bottom match. In this manner, the loop conditions top, bottom and count may define the entry and exit conditions of a hardware loop.

The processor 100 may include an execution the pipeline 102 and the control unit 104. The control unit 104 may control the flow of instructions and/or data through the pipeline 102 during a clock cycle. For example, during the processing of an instruction, the control unit 104 may direct the various components of the pipeline to decode the instruction and correctly perform the corresponding operation including, for example, writing the results back to memory.

Instructions may be loaded into a first stage of the pipeline 102 and processed through subsequent stages. A stage may process concurrently with the other stages. Data may pass between the stages in the pipeline 102 during a cycle of the system. The results of an instruction may emerge at the end of the pipeline 102 in rapid succession.

The control unit 104 may include hardware loop unit 108 that, as described below, may facilitate fast hardware loops without significantly increasing power consumption of the processor 100.

Figure 2:
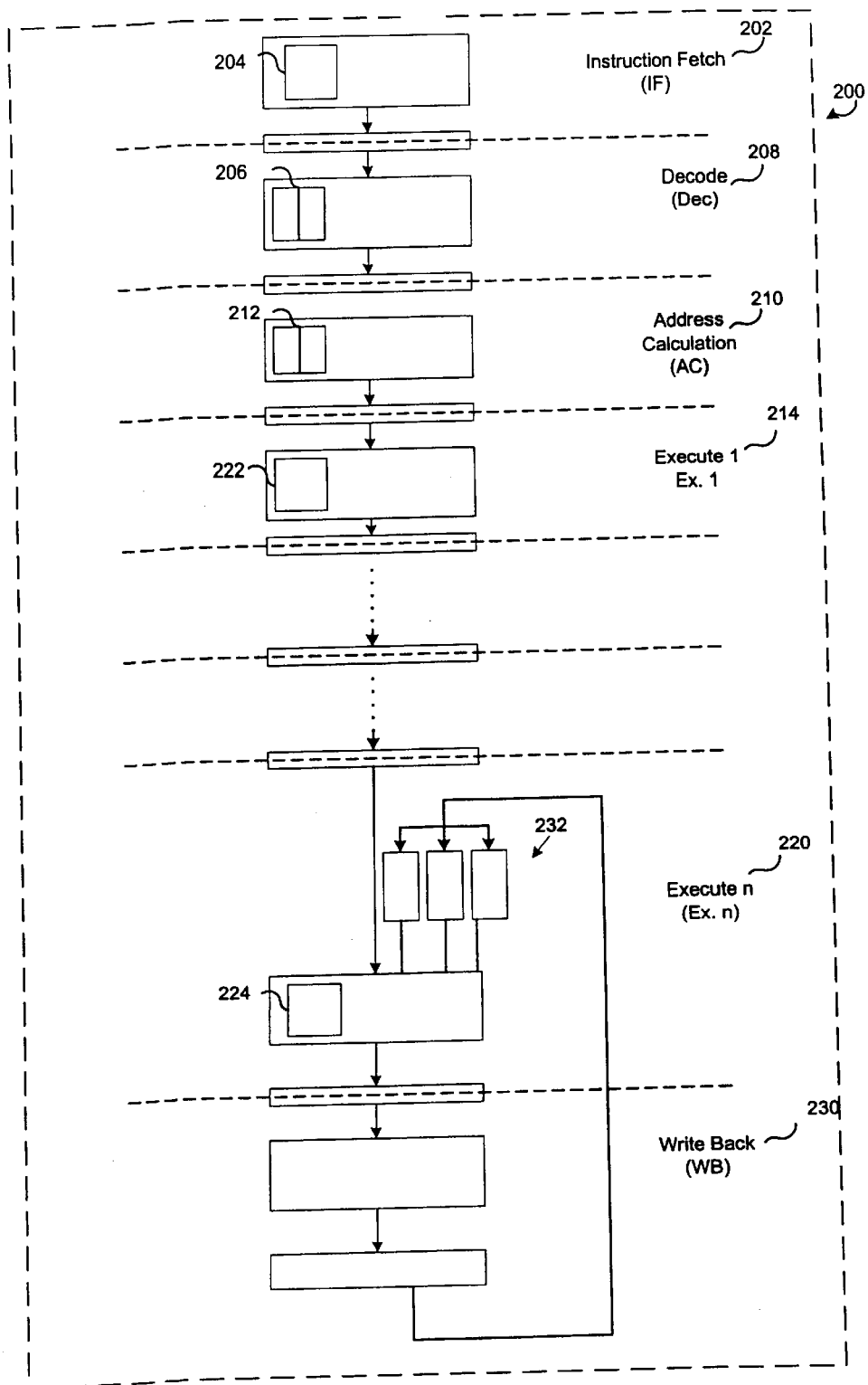
FIG. 2 is a block diagram illustrating an example execution pipeline for the programmable processor in accordance with an embodiment of the present invention.

FIG. 2 is a block diagram illustrating an example pipeline 200. The pipeline 200 has multiple stages that may facilitate execution of multiple instructions during a single clock cycle. In pipeline 200, an instruction may enter the instruction fetch (IF) stage 202 during a first clock cycle. The instruction may then continue down the pipeline during subsequent clock cycles. Another instruction may enter the IF stage 202 after a previous, instruction has exited. Thus, typically another instruction enters the IF stage 202 during a subsequent clock cycle and then continues down the pipeline during subsequent clock cycles. Similarly, additional instructions enter the IF stage 202 during subsequent clock cycles respectively. The number of stages in the pipeline may define the number of instructions that the pipeline may service simultaneously.

The different stages of the pipeline may operate as follows. Instructions may be fetched during the IF stage 202 by a fetch unit 204 and decoded from instruction registers 206 during a decode (DEC) stage 208. During an address calculation (AC) stage 210, data address generators 212 may calculate any memory addresses used to perform the operation.

During the execution stages (EX 1 to EX n) 214 and 220, execution units 222 and 224 may perform specified operations such as, for example, adding or multiplying two numbers. Execution units may contain specialized hardware for performing the operations including, for example, one or more arithmetic logic units (ALUs), floating-point units (FPU) and barrel shifters.

A variety of data may be applied to the execution units such as the addresses generated by data address generators, data retrieved from memory or data retrieved from data registers. During a write back stage (WB) 230, the results may be written to a memory location or data registers external to the pipeline or to data registers in the pipeline such as architectural registers 232. The stages of pipeline 200 may include one or more storage circuits, such as a flip-flop, for storing data.

Figure 3:
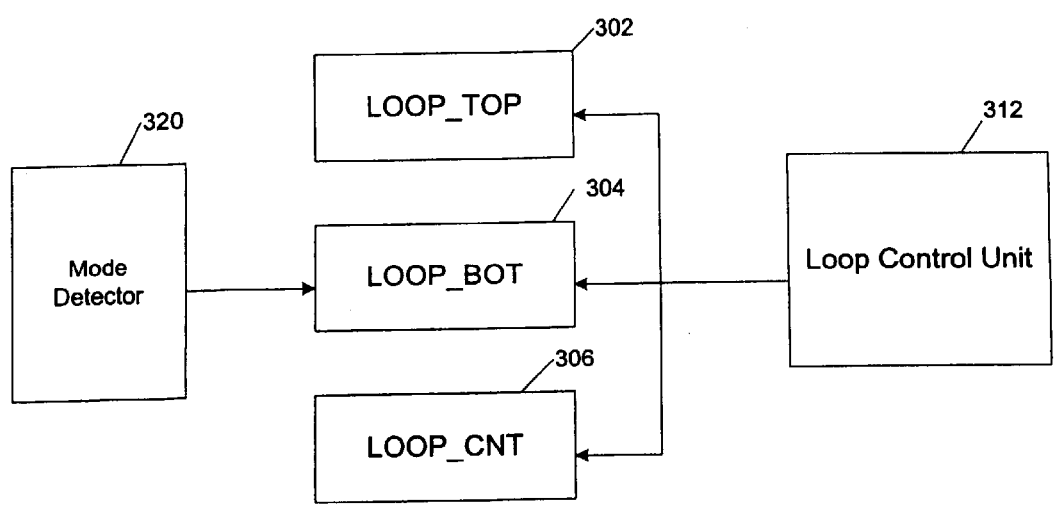
FIG. 3 is block diagram illustrating hardware loop control architecture according to an embodiment.

FIG. 3 is a block diagram of the loop unit 108 of FIG. 1. The hardware loop unit 108 may include a LOOP_TOP register 302, a LOOP_BOT register 304, and LOOP_CNT register 306, and a loop control unit 312. The hardware loop unit may initialize a loop by loading the address of the top instruction of the loop in the LOOP_TOP register 302, the address of the bottom instruction in the loop in the LOOP_BOT register 304, and a count indicating the number of times the loop is to be completed in the LOOP_CNT register 306. The loop control unit may compare the values in the LOOP_TOP register 302 and the LOOP_BOT register 304 to the current PC. Upon detecting a top match, the loop control unit may begin a hardware loop operation. When a bottom match occurs, the loop control unit 312 may decrement the value in the LOOP_CNT register 306 and branch the PC back to the address of the top instruction. The hardware loop may operate in the pipeline until the exit condition of the loop has been satisfied, e.g., a bottom match with count equal to zero.

A security hazard may exist if the user program obtains an address of an instruction in the supervisor program address space, for example, an instruction address in an event vector table (EVT) 120 (FIG. 1). The EVT may include the target address for event service routines. Events may include exceptional conditions that cause a break in program flow. Events such as I/O device interrupts, misaligned memory accesses, hardware malfunctions, etc., may be handled in the processor 100 by a corresponding event service routine. When a particular event occurs, the processor 100 may look up the appropriate target address for the event service routine for that event in the EVT 120 and branch the PC to the event service routine to handle the event. When the processor 100 services an event, it enters the supervisor mode and gains the corresponding privileges. After the event is handled, the processor 100 may return to the user mode and continue the interrupted program flow.

A user program that acquired the a target address in the EVT 120, for example, for an event service routine for handling a common I/O device interrupt, could load the LOOP_BOT register 304 with the address of an event service routine and load the LOOP_TOP register 302 with the address of an instruction in the user program address space.

Consider a situation in which the supervisor code is located at hexadecimal addresses 1000 to 2000 and the user code is located at hexadecimal addresses 10,000 to 20,000. In this example, the target address for the event service routine for the I/O device interrupt is instruction address 1004 and the user program loads 1004 into the LOOP_BOT register and loads 10,000 into the LOOP_TOP register. When that I/O device interrupt occurs, the supervisor program checks the EVT 120 and branches the PC to instruction 1004. This causes a bottom match. In response to the bottom match, the hardware loop unit 108 causes the PC to implicitly branch to the instruction address in the LOOP_TOP register 302, 10,200, which resides in the user code address space. When the PC branches to the instruction in the user code, the user program gains control of the processor. However, the processor 100 may remain in the supervisor mode. Hence the user program acquires supervisory privileges it is usually denied. A malicious user program could use those privileges to disrupt or disable the system.

Figure 4:
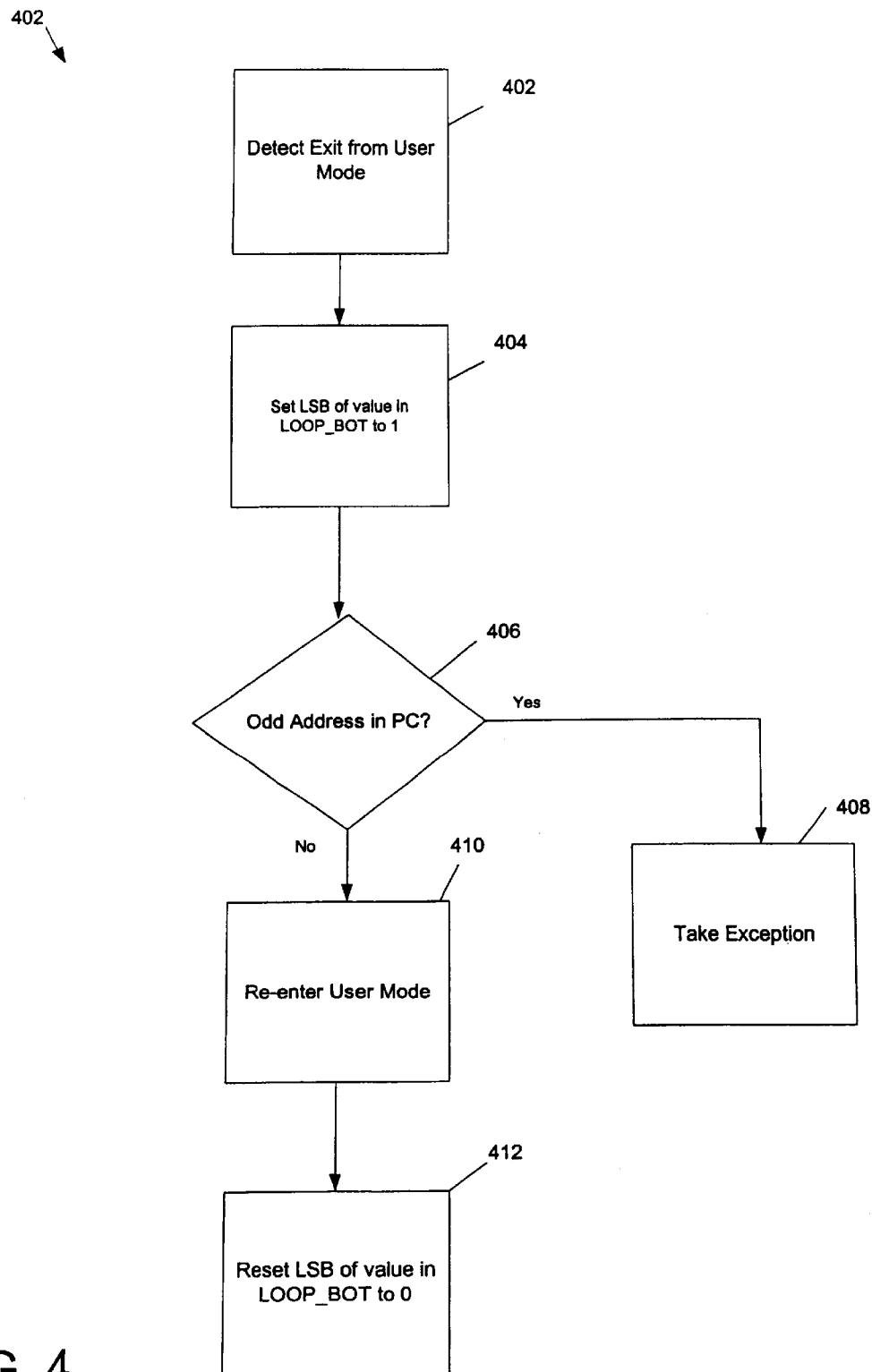
FIG. 4 is a flow diagram illustrating an operation for providing security on a hardware loop according to an embodiment.

FIG. 4 is a flowchart of an operation 400 according to an embodiment. The following description is one embodiment of implementing the operation 400. In other embodiments, blocks may be skipped or performed in a different order.

As shown in FIG. 3, a mode detector 320 may be coupled to the LOOP_BOT register 304. The mode detector 320 may detect when the processor exits the user mode in block 402. When the processor 100 exits the user mode, the mode detector 320 may set the least significant bit (LSB) of the instruction address in the LOOP_BOT register to one in block 404.

Since the instruction addresses are aligned on even addresses, the loop control unit 310 should not encounter an odd address; the LSB should always be zero. Hence, a bottom match should not occur when the processor is in the supervisor mode. Consider the example given above. The user program loads instruction address 1004 (binary—"0000 0011 1110 1100") in the LOOP_BOT register 304 in the user mode. When the processor exits the user mode, the mode detector 320 sets the LSB of the address to one, and the value in the LOOP_BOT register becomes 1005 ("0000 0011 1110 1101").

Since all instruction addresses should be evenly aligned, if the PC does encounter an odd address in the program flow in block 406, the processor 100 may take an exception in block 408. In an embodiment, the exception has a higher priority than a bottom match. Thus, even though a bottom match occurred, the processor 100 branches to the event service routine for handling the exception rather than branching to the address in the LOOP_TOP register 302, thereby avoiding the security hazard.

When the processor reenters the user mode in block 410, the mode detector 320 may set the LSB of the value in the LOOP_BOT register 306 back to zero in block 412, thereby re-enabling the hardware loop architecture.

Such a processor 100 is contemplated for use in video camcorders, teleconferencing, PC video cards, and High-Definition Television (HDTV). In addition, the processor 100 is also contemplated for use in connection with other technologies utilizing digital signal processing such as voice processing used in mobile telephony, speech recognition, and other applications.

Figure 5:
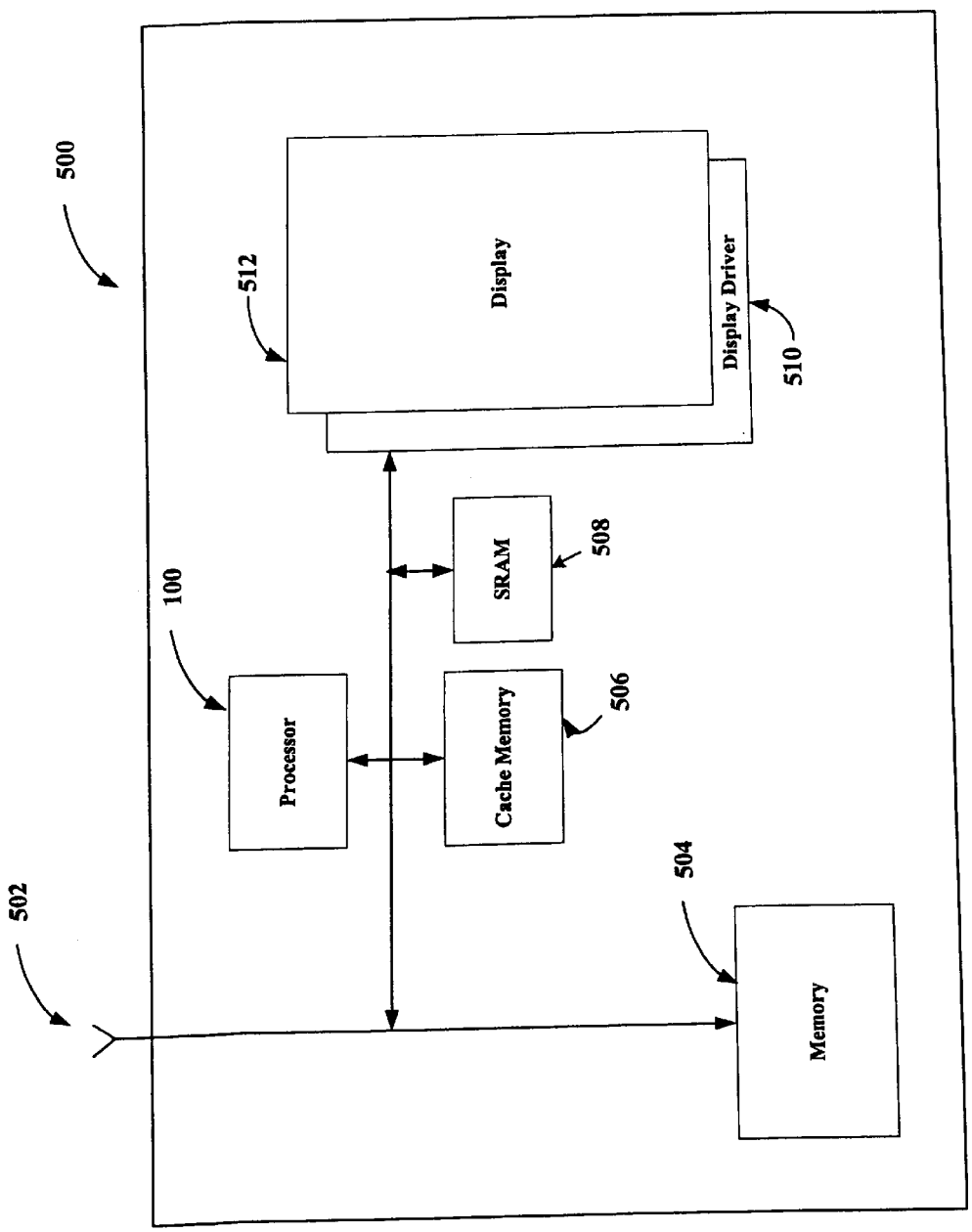
FIG. 5 is a block diagram of a mobile video unit including a processor according to an embodiment.

For example, FIG. 5 illustrates a mobile video device 500 including a processor 100 according to an embodiment. The mobile video device 500 may be a hand-held device which displays video images produced from an encoded video signal received from an antenna 502 or a digital video storage medium 504, e.g., a digital video disc (DVD) or a memory card. The processor 100 may communicate with a cache memory 506, which may store instructions and data for the processor operations, and other devices, for example, an SRAM 508.

The processor 100 may be a microprocessor, a digital signal processor (DSP), a microprocessor controlling a slave DSP, or a processor with an hybrid microprocessor/DSP architecture. The processor 100 may perform various operations on the encoded video signal, including, for example, analog-to-digital conversion, demodulation, filtering, data recovery, and decoding. The processor 100 may decode the compressed digital video signal according to one of various digital video compression standards such as the MPEG-family of standards and the H.263 standard. The decoded video signal may then be input to a display driver 510 to produce the video image on a display 512.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   operating a processor in at least first and second operating modes; and
   disabling a hardware loop operation associated with the processor upon exiting said first operating mode;
   wherein operating a processor in at least first and second operating modes includes operating in a first mode being a user mode.

2. The method of claim 1, wherein operating a processor in at least first and second operating modes includes operating in a second mode being a supervisor mode.

3. The method of claim 1, further comprising:
   initializing the hardware loop operation in the first mode; and
   detecting an exit from the first mode.

4. The method of claim 3, wherein said initializing the hardware loop operation comprises:
   loading an evenly aligned top instruction address in a first register; and
   loading an evenly aligned bottom instruction address in a second register.

5. The method of claim 1, further comprising:
   enabling a hardware loop operation upon entering the first operating mode.

6. A method comprising:
   operating a processor in at least first and second operating modes;
   disabling a hardware loop operation associated with the processor upon exiting said first operating mode
   initializing the hardware loop operation in the first mode;
   detecting an exit from the first mode;
   loading an evenly aligned top instruction address in a first register; and
   loading an evenly aligned bottom instruction address in a second register,
   wherein said disabling the hardware loop operation comprises setting a least significant bit of the bottom instruction address in the second register to one.

7. The method of claim 6, wherein the first mode is a user mode.

8. A method comprising:
   operating a processor in at least first and second operating modes;
   disabling a hardware loop operation associated with the processor upon exiting said first operating mode
   initializing the hardware loop operation in the first mode;
   detecting an exit from the first mode;
   loading an evenly aligned top instruction address in a first register; and
   loading an evenly aligned bottom instruction address in a second register,
   wherein loading an evenly aligned top instruction address includes loading an evenly aligned byte address, and
   wherein loading an evenly aligned bottom instruction address includes loading an evenly aligned byte address.

9. The method of claim 8, wherein the first mode is a user mode.

10. A method comprising:
    operating a processor in at least first and second operating modes;
    disabling a hardware loop operation associated with the processor upon exiting said first operating mode; and
    enabling a hardware loop operation upon entering the first operating mode;
    loading an evenly aligned top instruction address in a first register;
    loading an evenly aligned bottom instruction address in a second register;
    detecting entry into the first operating mode; and
    setting a least significant bit of the bottom instruction address in the second register to zero.

11. The method of claim 10, wherein the first mode is a user mode.

12. A method comprising:
    operating a processor in at least first and second operating modes;
    disabling a hardware loop operation associated with the processor upon exiting said first operating mode; and
    enabling a hardware loop operation upon entering the first operating mode,
    wherein the top and bottom instruction addresses comprise evenly aligned byte addresses.

13. The method of claim 12, wherein the first mode is a user mode.

14. An article having a machine-readable medium comprising machine-executable instructions for providing security in a processor, the instructions causing a machine to:
    operate the processor in at least first and second operating modes; and
    disable a hardware loop operation upon exiting the first operating mode,
    wherein the first mode is a user mode.

15. The article of claim 14, wherein the second mode is a supervisor mode.

16. The article of claim 14, further comprising instructions that cause the machine to:
initialize the hardware loop operation in the first mode; and
detect an exit from the first mode.

17. The article of claim 16, wherein the instructions that cause the machine to initialize the hardware loop operation comprise instructions causing the machine to:
load an evenly aligned top instruction address in a first register; and
load an evenly aligned bottom instruction address in a second register.

18. The article of claim 14, further comprising instructions that cause the machine to:
enable a hardware loop operation upon entering the first operating mode.

19. An article having a machine-readable medium comprising machine-executable instructions for providing security in a processor, the instructions causing a machine to:
operate the processor in at least first and second operating modes;
disable a hardware loop operation upon exiting the first operating mode;
initialize the hardware loop operation in the first mode;
detect an exit from the first mode;
load an evenly aligned top instruction address in a first register; and
load an evenly aligned bottom instruction address in a second register,
wherein the instructions that cause the machine to disable the hardware loop operation comprise instructions that cause the machine to set a least significant bit of the bottom instruction address in the second register to one.

20. The article of claim 19, wherein the first mode is a user mode.

21. An article having a machine-readable medium comprising machine-executable instructions for providing security in a processor, the instructions causing a machine to:
operate the processor in at least first and second operating modes;
disable a hardware loop operation upon exiting a first operating mode;
initialize the hardware loop operation in the first mode;
detect an exit from the first mode;
load an evenly aligned top instruction address in a first register; and
load an evenly aligned bottom instruction address in a second register,
wherein the top and bottom instruction addresses comprise evenly aligned byte addresses.

22. The article of claim 21, wherein the first mode is a user mode.

23. An article having a machine-readable medium comprising machine-executable instructions for providing security in a processor, the instructions causing a machine to:
operate the processor in at least first and second operating modes;
disable a hardware loop operation upon exiting the first operating mode;
enable a hardware loop operation upon entering the first operating mode;
load an evenly aligned top instruction address in a first register;
load an evenly aligned bottom instruction address in a second register;
detect entry into the first operating mode; and
set a least significant bit of the bottom instruction address in the second register to zero.

24. The article of claim 23, wherein the first mode is a user mode.

25. An article having a machine-readable medium comprising machine-executable instructions for providing security in a processor, the instructions causing a machine to:
operate the processor in at least first and second operating modes;
disable a hardware loop operation upon exiting the first operating mode; and
enable a hardware loop operation upon entering the first operating mode,
wherein the top and bottom instruction addresses comprise evenly aligned byte addresses.

26. The article of claim 25, wherein the first mode is a user mode.

27. A processor comprising:
a first register to store an address of a top instruction in a hardware loop;
a second register to store an address of a bottom instruction in the hardware loop;
a hardware loop controller coupled to the first and second registers, said controller operative to perform the hardware loop operation; and
a mode detector operative to disable the hardware loop controller in response to the processor exiting a first operating mode,
wherein the first operating mode is a user mode.

28. The processor of claim 27, wherein the processor is further operable in a supervisor mode.

29. The processor of claim 27, wherein the mode detector is operative to enable the hardware loop controller in response the processor entering the first operating mode.

30. The processor of claim 27, wherein the address of the bottom instruction is evenly aligned.

31. A processor comprising:
a first register to store an address of a top instruction in a hardware loop;
a second register to store an address of a bottom instruction in the hardware loop;
a hardware loop controller coupled to the first and second registers, said controller operative to perform the hardware loop operation; and
a mode detector operative to disable the hardware loop controller in response to the processor exiting a first operating mode,
wherein the address of the bottom instruction is evenly aligned, and
wherein the top and bottom instruction addresses comprise evenly aligned byte addresses.

32. The processor of claim 31, wherein the first mode is a user mode.

33. A processor comprising:
a first register to store an address of a top instruction in a hardware loop;
a second register to store an address of a bottom instruction in the hardware loop;

a hardware loop controller coupled to the first and second registers, said controller operative to perform the hardware loop operation; and a mode detector operative to disable the hardware loop controller in response to the processor exiting a first operating mode, wherein the address of the bottom instruction is evenly aligned, and wherein the mode controller is operative to set a least significant bit of the address in the second register to one in response to the processor exiting the first mode.

34. The processor of claim 33, wherein the first mode is a user mode.

35. A processor comprising:

a first register to store an address of a top instruction in a hardware loop;

a second register to store an address of a bottom instruction in the hardware loop;

a hardware loop controller coupled to the first and second registers, said controller operative to perform the hardware loop operation; and a mode detector operative to disable the hardware loop controller in response to the processor exiting a first operating mode, wherein the address of the bottom instruction is evenly aligned, and wherein the mode controller is operative to set a least significant bit of the address in the second register to zero in response to the processor entering the first mode.

36. The processor of claim 35, wherein the first mode is a user mode.

37. A system comprising:

a static random address memory; and a processor coupled to the static random access memory, said processor comprising:

a first register to store an address of a top instruction in a hardware loop;

a second register to store an address of a bottom instruction in the hardware loop;

a hardware loop controller coupled to the first and second registers, said controller operative to perform the hardware loop operation; and a mode detector operative to disable the hardware loop controller in response to the processor exiting a first operating mode, wherein the first operating mode is a user mode.

38. The processor of claim 37, wherein the processor is further operable in a supervisor mode.

39. The processor of claim 37, wherein the mode detector is operative to enable the hardware loop controller in response the processor entering the first operating mode.

40. The system of claim 37, wherein the address of the bottom instruction is evenly aligned.

41. A system comprising:

a static random address memory; and a processor coupled to the static random access memory, said processor comprising:

a first register to store an address of a top instruction in a hardware loop;

a second register to store an address of a bottom instruction in the hardware loop;

a hardware loop controller coupled to the first and second registers, said controller operative to perform the hardware loop operation; and a mode detector operative to disable the hardware loop controller in response to the processor exiting a first operating mode, wherein the address of the bottom instruction is evenly aligned, and wherein the top and bottom instruction addresses comprise evenly aligned byte addresses.

42. The system of claim 41, wherein the first mode is a user mode.

43. A system comprising:

a static random address memory; and a processor coupled to the static random access memory, said processor comprising:

a first register to store an address of a top instruction in a hardware loop;

a second register to store an address of a bottom instruction in the hardware loop;

a hardware loop controller coupled to the first and second registers, said controller operative to perform the hardware loop operation; and a mode detector operative to disable the hardware loop controller in response to the processor exiting a first operating mode, wherein the address of the bottom instruction is evenly aligned, and wherein the mode controller is operative to set a least significant bit of the address in the second register to one in response to the processor exiting the first mode.

44. The system of claim 43, wherein the first mode is a user mode.

45. A system comprising:

a static random address memory; and a processor coupled to the static random access memory, said processor comprising:

a first register to store an address of a top instruction in a hardware loop;

a second register to store an address of a bottom instruction in the hardware loop;

a hardware loop controller coupled to the first and second registers, said controller operative to perform the hardware loop operation; and a mode detector operative to disable the hardware loop controller in response to the processor exiting a first operating mode, wherein the address of the bottom instruction is evenly aligned, and wherein the mode controller is operative to set a least significant bit of the address in the second register to zero in response to the processor entering the first mode.

46. The system of claim 45, wherein the first mode is a user mode.

* * * * *